(12) United States Patent
Cahen et al.

(10) Patent No.: US 8,770,093 B2
(45) Date of Patent: Jul. 8, 2014

(54) BEVERAGE MACHINE WITH DRIP TRAY DEVICE FOR RECIPIENTS OF DIFFERENT HEIGHTS

(75) Inventors: Antoine Cahen, Lausanne (CH); Michael Stieger, La Croix (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 13/225,968

(22) Filed: Sep. 6, 2011

(65) Prior Publication Data
US 2012/0000933 A1    Jan. 5, 2012

Related U.S. Application Data

(63) Continuation of application No. 11/422,802, filed on Jun. 7, 2006, now Pat. No. 8,091,469.

(30) Foreign Application Priority Data

Jun. 7, 2005    (EP) .................................. 05104950

(51) Int. Cl.
*A47J 31/00* (2006.01)
*B67D 1/16* (2006.01)
*A47J 31/44* (2006.01)
*A47J 31/41* (2006.01)

(52) U.S. Cl.
CPC ............. *A47J 31/4485* (2013.01); *A47J 31/41* (2013.01)
USPC ................ 99/294; 99/279; 222/129; 222/108

(58) Field of Classification Search
CPC ...... A47J 31/462; A47J 31/4485; A47J 31/41
USPC ........... 99/279–323, 275, 277, 348, 452–455; 426/112, 596; 222/108, 129.1, 173, 222/250; 141/86–88
See application file for complete search history.

(56) References Cited

U.S. PATENT DOCUMENTS

| | | | |
|---|---|---|---|
| 2,598,665 A | | 6/1952 | Levings |
| 2,827,845 A | * | 3/1958 | Richeson .................... 99/282 |
| 3,094,154 A | * | 6/1963 | Daniels ........................ 141/88 |
| 3,327,902 A | * | 6/1967 | Alterwitz .................... 222/108 |
| 4,342,710 A | * | 8/1982 | Adolfsson et al. ......... 261/121.1 |
| 4,944,332 A | | 7/1990 | Belland |
| 4,949,631 A | | 8/1990 | Fregnan |
| 5,207,148 A | | 5/1993 | Anderson et al. |
| 5,295,431 A | | 3/1994 | Schiettecatte et al. |
| 5,305,924 A | * | 4/1994 | Groover et al. ............ 222/129.1 |

(Continued)

FOREIGN PATENT DOCUMENTS

| | | |
|---|---|---|
| DE | 9109023 | 11/1992 |
| EP | 0 472 272 | 2/1992 |

(Continued)

*Primary Examiner* — Jianying Atkisson
(74) *Attorney, Agent, or Firm* — K&L Gates LLP (57) ABSTRACT

A beverage machine comprising a drip tray device that can accommodate recipients of different heights. The drip tray device is formed of a collect tank and has a first drip support grid removably mounted on the tank for holding short recipients and has a second drip support for longer recipients such as a glass. The whole device is removable for ease of emptying and rinsing. In a possible mode, the first removable grid is provided with a gutter to evacuate liquid in a main collect reservoir.

13 Claims, 7 Drawing Sheets

(56) References Cited

U.S. PATENT DOCUMENTS

| | | | |
|---|---|---|---|
| 5,473,972 | A | 12/1995 | Rizzuto et al. |
| 5,498,757 | A | 3/1996 | Johnson et al. |
| 5,509,349 | A | 4/1996 | Anderson et al. |
| 5,542,572 | A | 8/1996 | Davis |
| 5,549,036 | A | 8/1996 | Hourizadeh |
| 5,611,262 | A | 3/1997 | Rizzuto et al. |
| 5,628,239 | A | 5/1997 | Wu |
| 5,768,975 | A | 6/1998 | Wu |
| 5,855,162 | A | 1/1999 | Bauer et al. |
| 5,862,740 | A | 1/1999 | Grossi |
| 5,884,552 | A | 3/1999 | Lussi et al. |
| 5,992,298 | A * | 11/1999 | Illy et al. .................. 99/281 |
| 6,183,800 | B1 | 2/2001 | van Straten et al. |
| 6,192,785 | B1 * | 2/2001 | Trida et al. .................. 99/284 |
| 6,293,187 | B1 * | 9/2001 | Zils .................. 99/323.1 |
| 6,499,389 | B1 | 12/2002 | Probst |
| 6,827,243 | B1 * | 12/2004 | Nuzzolese .................. 222/628 |
| D549,914 | S | 8/2007 | Eskandari |
| 7,322,282 | B2 | 1/2008 | Frigeri |
| 2002/0134248 | A1 | 9/2002 | Eugster |
| 2003/0010397 | A1 | 1/2003 | Jungmann et al. |
| 2003/0034359 | A1 | 2/2003 | Lassota |
| 2004/0191370 | A1 * | 9/2004 | Halliday et al. .................. 426/112 |
| 2006/0113408 | A1 | 6/2006 | Stieger et al. |
| 2006/0254428 | A1 * | 11/2006 | Glucksman et al. ......... 99/302 P |
| 2007/0243305 | A1 * | 10/2007 | Marconi .................. 426/596 |

FOREIGN PATENT DOCUMENTS

| | | |
|---|---|---|
| EP | 585607 | 3/1994 |
| EP | 0 813 834 | 12/1997 |
| EP | 1430819 | 6/2004 |
| EP | 1440639 | 7/2004 |
| FR | 2708185 | 12/2006 |
| JP | 2006341097 | 12/2006 |
| WO | 0172190 | 10/2001 |
| WO | 2004054413 | 7/2004 |

* cited by examiner

BEVERAGE MACHINE WITH DRIP TRAY DEVICE FOR RECIPIENTS OF DIFFERENT HEIGHTS

CROSS REFERENCE TO RELATED APPLICATIONS

This application is a continuation of U.S. patent application Ser. No. 11/422,802, filed Jun. 7, 2006, which claims priority to EP 05104950.0, filed on Jun. 7, 2005, the entire contents of which are expressly incorporated herein by reference thereto.

BACKGROUND

The invention relates to a machine for the preparation of beverages with a drip tray device configured to collect dripping liquid or liquid waste from recipients of variable dimensions, in particular, from short and long beverage recipients. The invention also relates to a milk froth dispensing device.

Beverage preparation machines are becoming very popular whether at home or in offices. There is a demand for machines that can prepare and deliver different beverage specialties; in particular, coffee and/or milk based beverages. For instance, machines exist for both extracting coffee capsules or pods and delivering milk froth thus providing the possibility to prepare both espresso coffee, cappuccino and macchiato. These beverages are served in recipients of different sizes. Espresso coffees are typically served in 40-mL cups, while cappuccinos are served in 110-mL cups and macchiatos are served in long glasses or mugs of even larger volumes.

Furthermore, for espresso or ristretto type coffees, it is important for preserving the "crema" quality of the coffee to respect a sufficiently small distance between the coffee outlet and the cup.

Typically beverage machines have a drip tray adapted to collect the dripping liquid and waste liquid (water or beverage) that does not readily fall into the recipient. The drip tray must be emptied and rinsed by the user. This simple hygiene maintenance depends on the use and rest time of the machine but should be carried out frequently enough to avoid bad smells and organic growth.

It exists machines with drip tray devices which are configured to receive recipients of variable heights. However, the existing devices have all drawbacks. Some are not stable enough, not convenient enough to use, too complicated and/or too costly to manufacture.

US patent publication 2003/0034359 relates to a beverage dispenser with drip tray assembly for a portable coffee dispenser.

EP patent application 1 440 639 A1 refers to a beverage machine comprising a receptacle stand having a hollow interior forming a drip tray. An upper surface of the receptacle stand is provided with a grill on which the receptacle is positioned. The drip tray is removable from the housing to ease emptying of the collected water.

SUMMARY

The present invention aims at proposing a beverage machine equipped with a drip tray device which overcomes these drawbacks. In particular, one object of the invention is to propose a device which is simpler to use and more efficient.

For that, the present invention is for a beverage machine comprising a drip tray device placed below at least a beverage outlet for collecting dripping liquid and/or foam; the drip tray device comprising a first drip support grid for holding a first beverage recipient and a collect tank for collecting the liquid passing through the support grid; wherein the first support grid is removable from the collect tank and, when removed, it leaves open a second drip support underneath configured for holding a second beverage recipient of larger height.

One aspect of the invention lies in having a first drip support grid that can simply be removed to uncover a second drip support underneath. The user does not have to spend more time and effort for manipulating or making the drip tray adapted to a longer size of recipient and thus operational for serving the beverage. Another advantage lies in that the beverage outlet and the fluid system attached to it, can be maintained in a fixed referential position while this is only the plane surface for receiving the beverage recipient that moves. This removes much complexity to the machine.

Another aspect is to have the whole device removable for easy liquid emptying and cleaning.

The support grid can be removed either completely or removed partially in a manner to uncover the second recipient support underneath. For instance, the support grid can retract or move away from its support position to a retracted or moved away position while still being attached to the machine or to the collect tank by connection means such as an hinge and the like.

In a mode of the invention, the second support means is placed at several centimeters below the first support grid. The distance is chosen depending upon the typical long beverages to be prepared. Typically, the distance between the first and second support is of between 2 to 8 cm.

Preferably, the collect tank comprises a first reservoir for collecting liquid from the first support grid.

The second drip support means comprises a second collect reservoir to collect the dripping liquid when the second recipient of larger height is placed thereon. The reservoir can be made separate and closed from the main reservoir of the collect tank.

In a mode, the first reservoir is placed rearwardly and/or laterally adjacent but separate to the second reservoir.

In a possible mode, the first and second reservoirs are linked in a manner that they communicate together. For instance, the second reservoir is configured with a slope or altitude difference to naturally drain into the first reservoir. The first reservoir is preferably a reservoir of larger capacity.

In one mode, the first support grid comprises a gutter. The gutter can be configured to direct the collected liquid that passes through the grid to the first reservoir of the collect tank. The gutter can be positioned over the second support means so that the dripping liquid is drained to the first main reservoir of the collect tank without the second support means being contaminated by the liquid dripping from the first support grid. Typically, the second support means is used less frequently. Therefore, the waste liquid does not fall onto the second support means underneath and therefore it can remain cleaner until its use.

Preferably, the first reservoir is placed at the rear of the collect tank. The gutter is therefore configured to slope rearwardly and downwardly. Therefore, the reservoir is hidden for less smell and kept away from the user's eyes for a better hygiene perception.

In a mode, the second drip support means is provided at the bottom of a recess of a sufficient transverse section to be able to receive a second recipient therein; said recess being contoured at its sides and rear side by an adjacent wall of the collect tank. The benefit is there to ensure that drops of liquid and/or foam that would fall outside the area of the second dripping support means are also collected by the collect tank. More particularly, the recess of the second dripping support means is demarcated by walls of the first large reservoir. Another advantage is that by having such a raised side drip collector that at least partly surrounds the recessed lower drip support, side liquid projections can be better recovered in the reservoir.

An additional grid can be provided to hide the first reservoir of the collect tank when the first support grid is removed. This provides a better external visual perception for the user who does not directly see the waste liquid in the collect tank. However, this grid is optional and could be omitted.

In a mode of the invention, the first support grid has a front cover that is designed to close the recess when in place. In that way, the reservoir of the second drip support remains closed when the device is removed for emptying. One thus avoids a "wave" effect and liquid overflowing during the removal of the device from the machine and its transport to the sink for emptying and rinsing.

In a mode, the collect tank comprises a single reservoir for collecting the liquid and/or foam from both first and second drip grid means; said reservoir being merely placed below the second drip support means.

In a mode, the machine can comprise a waste capsule recovery container associated with the collect tank so that any liquid from the container can be drained to the collect tank.

The invention also relates to a milk froth dispenser that can prepare and deliver, in a few seconds, in a very hygienic manner, a hot milk froth from liquid milk such as fresh milk contained in a thermo-insulated vessel.

Therefore, the invention relates to a milk froth dispenser comprising: a housing, the housing comprising a steamer adapted to produce steam under pressure through a steam outlet conduit; a disposable frothing nozzle that is configured to be removably plugged to the steam outlet conduit; and a drip tray device adapted to receive a recipient, wherein the dispenser comprises a milk vessel; the nozzle being fed with milk from the milk vessel by a tube or straw taking milk from the vessel to a milk inlet of the nozzle.

Preferably, the housing comprises a recess to receive the milk vessel in a removable manner.

Additional features and advantages are described herein, and will be apparent from, the following Detailed Description and the figures.

DETAILED DESCRIPTION

Figure 1:
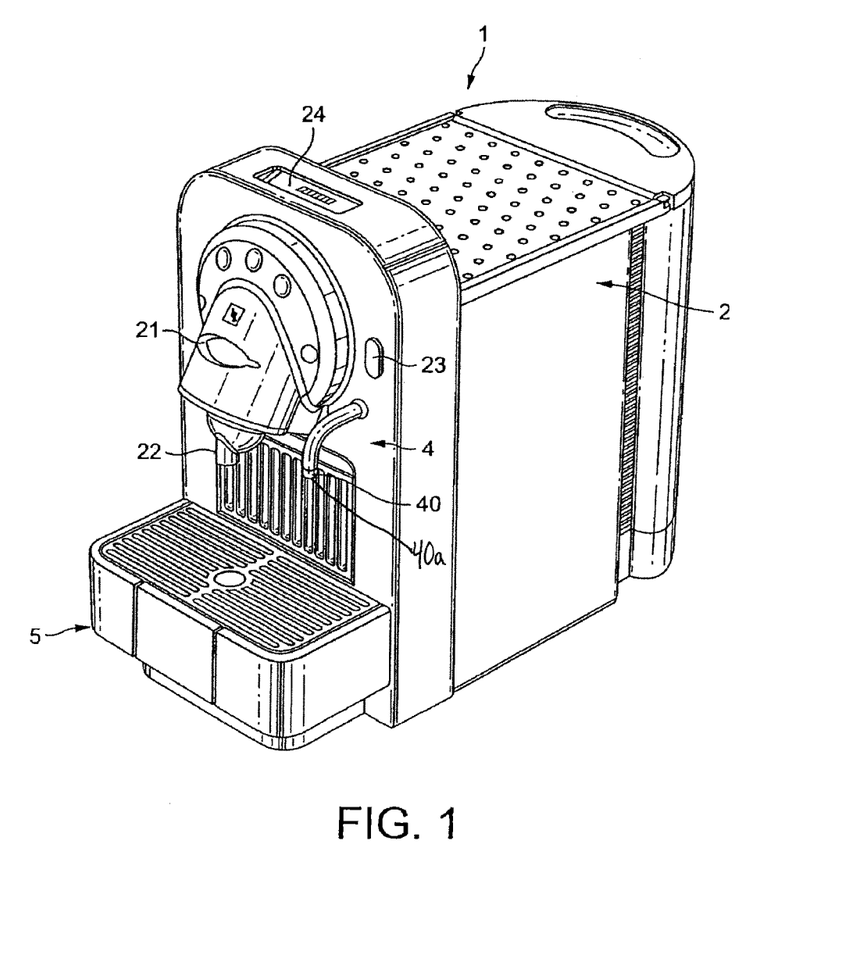
FIG. 1 shows a perspective view of a beverage machine equipped with the convertible drip tray device of the invention.
Figure 2:
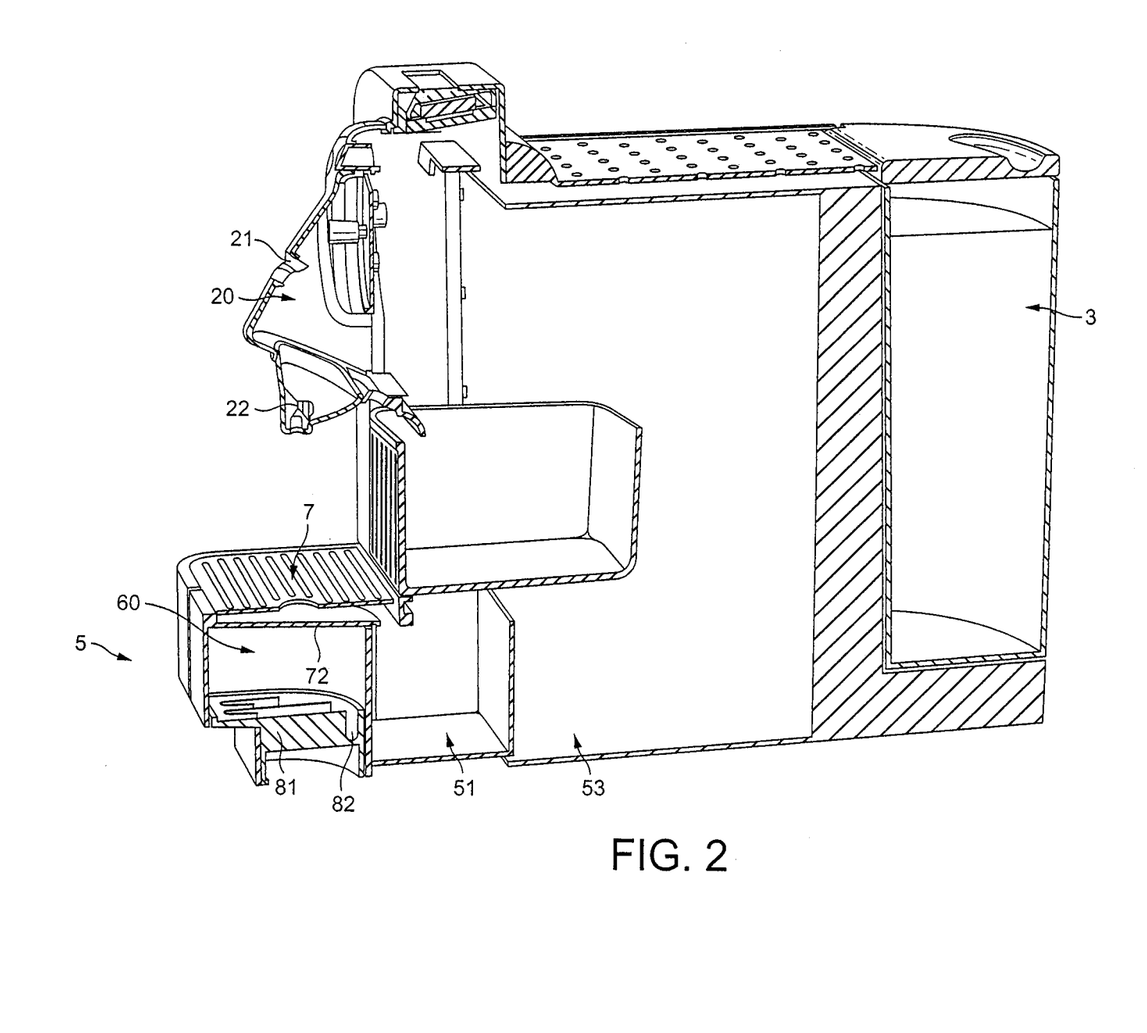
FIG. 2 is a simplified cross section view of the beverage machine of FIG. 1.

With reference to the drawing views, generally indicated, as 1 is a beverage machine, more particularly a coffee extraction machines which utilizes portioned coffee such as capsules in the preparation of the beverage. The machine comprises typical components necessary for the extraction and delivery of a beverage such as coffee and milk-based coffee specialties (e.g. cappuccino, machiatto, . . . ). As shown in FIGS. 1 and 2, The machine comprises within a cover and frame structure 2, a front housing 20 for receiving a capsule extraction module (not shown), the frame structure comprising an opening 21 shaped to the profile of the capsule for easy capsule insertion in the module. The extraction housing 20 terminates at its bottom end by a beverage (coffee) outlet 22 in the form of a collector and a funnelling portion of tube. The outlet 22 can be configured with particular means to break the energy of the beverage coming out of the extraction module and/or for conditioning the foam and/or for reducing splashing.

The machine further comprises a removable water supply tank 3 and internal components (not shown) necessary to supply hot water under pressure in the extraction module for preparing the hot beverages, in particular, a heater or boiler, a pump, tubing and an electronic controller. The machine also has a suitable command means 23 and eventually an information screen 24 to deliver short messages or information regarding the preparation of the beverage and/or servicing of the machine.

The machine may further comprise a steam supply device 4 which is placed on the side for the preparation of milk froth. The steam supply device may be a simple steam pipe 40 with a steam outlet 40a and, eventually, a frothing nozzle of the venturi type (not shown) as known in the art which is plugged to the steam outlet and which draws milk from a source of milk and froths it hot with a mixture of steam and air.

The versatility of the machine is such that both pure coffee beverages (e.g., ristretto or espresso) and frothed milk and coffee beverages (cappuccino, machiatto) can be produced.

Figure 3:
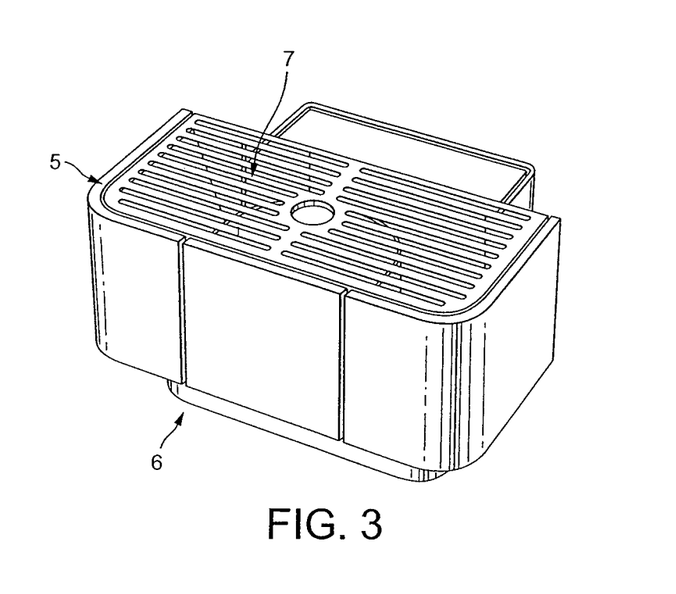
FIG. 3 shows a perspective view of the convertible drip tray device.

According to an aspect of the invention, the beverage machine comprises a drip tray device 5 configured to accommodate beverage recipients of variable heights. An exemplary of drip tray device 5 is shown in FIG. 3 when entirely removed from the rest of the machine for routine maintenance by the user (i.e., emptying, rinsing, cleaning). As shown in FIG. 2, the device is partly inserted in a cavity of the frame of the machine.

The drip tray device comprises a collect tank 6 and an upper drip support grid 7 which covers the collect tank during normal use with a small beverage recipient. The upper drip support grid 7 is removable with respect to the collect tank 6 to uncover underneath a second drip support 8 made in a recess 60 of the collect tank.

Figure 6:
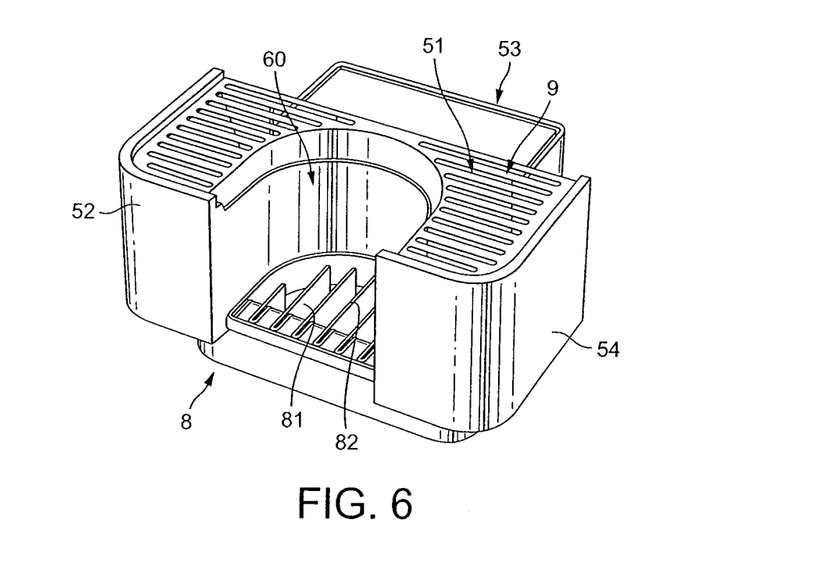
FIG. 6 shows the device of FIG. 3 with the upper drip support grid removed.
Figure 7:
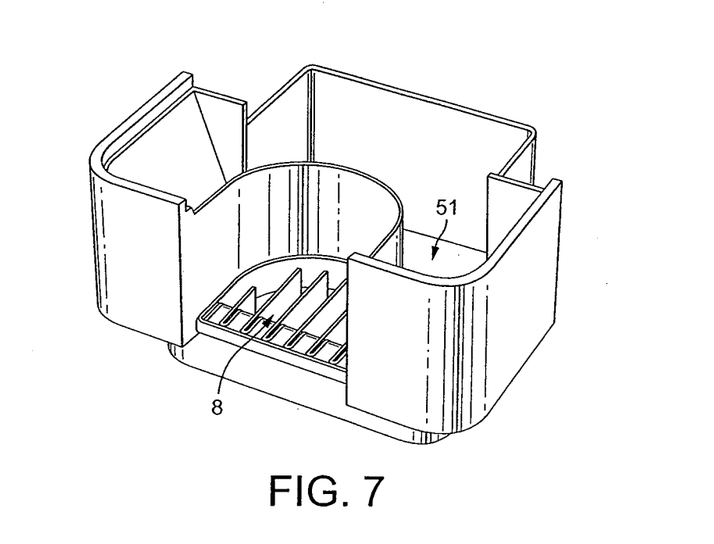
FIG. 7 shows the device of FIG. 6 with further the additional grid of the collect tank removed for liquid emptying and rinsing.

The collect tank houses a main reservoir 51 for collecting the dripping liquid and waste as shown by FIG. 6. The reservoir has a portion 54 which is transversally shaped in a U-form but could also be in an O-form to surround completely the recess 60. The reservoir thus demarcates the recess 60 along at least three sides, eventually four sides, by upwardly extending wall 52. The advantage is mainly about the simplicity of construction with an integrated lower drip support 8 and also to ensure that side liquid projections, extending beyond the area of the cross-section of the recess, are also captured in the reservoir 51.

The collect tank further extends rearwardly of the U-shaped reservoir making a rear reservoir extension 53 of smaller width and lower height for easing the integration and insertion in the machine. The rear reservoir extension also ensures that the bulk of the liquid mass is kept away from the user's eyes and so bad smells are also reduced accordingly. This also enables to combine the drip tray device with other components of the machine to collect liquid waste from these components whenever necessary. In particular, the reservoir is positioned at least partially under a waste capsule recovery container to recover liquid dripping from used coffee capsules. The waste capsule recovery container has thus a draining means such as one or more holes or tubes or a basket communicating with the reservoir underneath.

Figure 4:
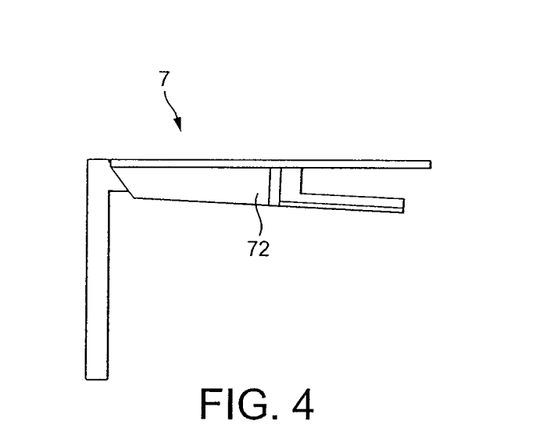
FIG. 4 shows a side view of the upper drip support grid of the device of FIG. 3.
Figure 5:
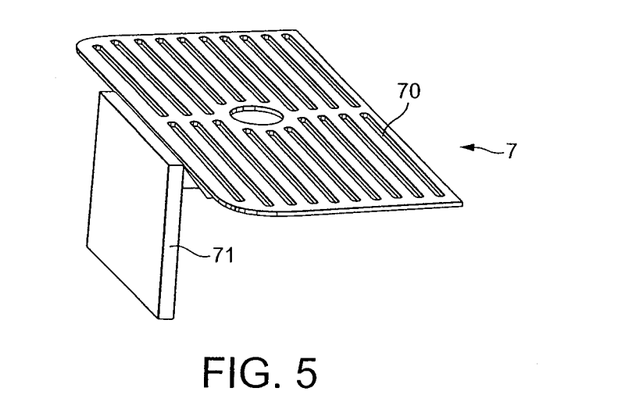
FIG. 5 shows a perspective view of the grid of FIG. 4.

FIGS. 4 and 5 shows a detail of the upper support grid 7. The grid is formed of a horizontal metallic or plastic apertured plate 70, a front cover wall 71 and a gutter 72 positioned under the plate 70.

The gutter 72 is designed to recover the liquid from the central area of the plate and evacuate it to the rear of the collect tank in the main reservoir 51. The gutter has a shape that substantially matches the section of the recess for the lower drip support. It is positioned above the recess and it leans downwards and rearwards. Consequently, when a short recipient is used with the upper drip support on, the liquid does not fall on the lower drip support for higher recipients but is transported to the back of the reservoir which thus permits to keep the lower support substantially clean.

In the front of the upper grid is placed the cover wall 71 which has for primary function to close the front of the recess when the grid is placed on. As a result, the liquid in the bottom of the lower drip support cannot escape the device during removal of the whole assembly and its transport to the sink.

Figure 8:
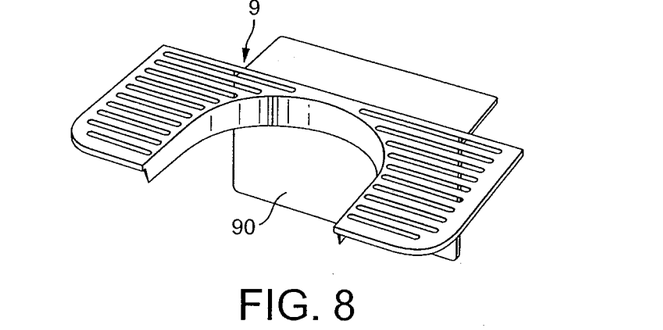
FIG. 8 shows the additional grid of the device.

As shown in FIG. 6, the collect tank possesses a secondary grid 9 which is also preferably made removable from the body of the tank, whose function is so primarily to hide the inside reservoir when the upper grid 7 is removed and the lower support 8 is used. This grid 9 is placed just below the first support grid 7 and fits a peripheral internal ridge bordering on the external wall and recess demarcating wall 52 of the tank. FIG. 8 also shows that the grid 9 can comprise a rear demarcation wall 90 which partially separates the main reservoir 51 and the rear reservoir 53.

As also shown on FIG. 6, the lower drip support 8 has recipient support elements 81 in the form of a plurality of support ridges protruding upwardly in a second reservoir 82. The support elements could also be replaced by a simple removable grid plate. The advantage of the ridges is that they can be made of the same piece as the rest of the collect tank by plastic moulding.

The second reservoir 82 can be made separate of the main reservoir 51 with no liquid communication means as illustrated in the example. In an alternative, there could be a passage, gutter, opening or other link, through wall 52, for the reservoir 82 to drain in the main reservoir 51.

The general rectangular shape and dimensions of the drip tray device is not essential and many variants can be envisaged although a large enough device is preferred for collecting all liquid including, as well, the water or milk drops below the steam delivery outlet.

FIGS. 9 to 12 illustrate a different embodiment for a milk froth dispenser 1b. The dispenser of the invention is configured to prepare hot frothed milk on demand from fresh milk and in a hygienic manner. The dispenser comprises a housing 2b. The housing encompasses a steamer such as a thermobloc which produces steam on demand. A water supply reservoir 29 can be provided in a side of the housing. A steam outlet conduit 22b is provided on the top front side of the housing. The outlet can be protected by a heat insulated plastic cover to prevent burning issues. The steam outlet conduit 22b terminates by a steam connector to which is plugged a disposable frothing device 41 that forms an extension to the connector. A disposable frothing device can be one as described in WO 2004/054413 or in US co-pending patent application Serial Number 11/279498 "Replaceable nozzle for producing a frothed liquid"; the contents of which are incorporated herewith by reference.

Figure 9:
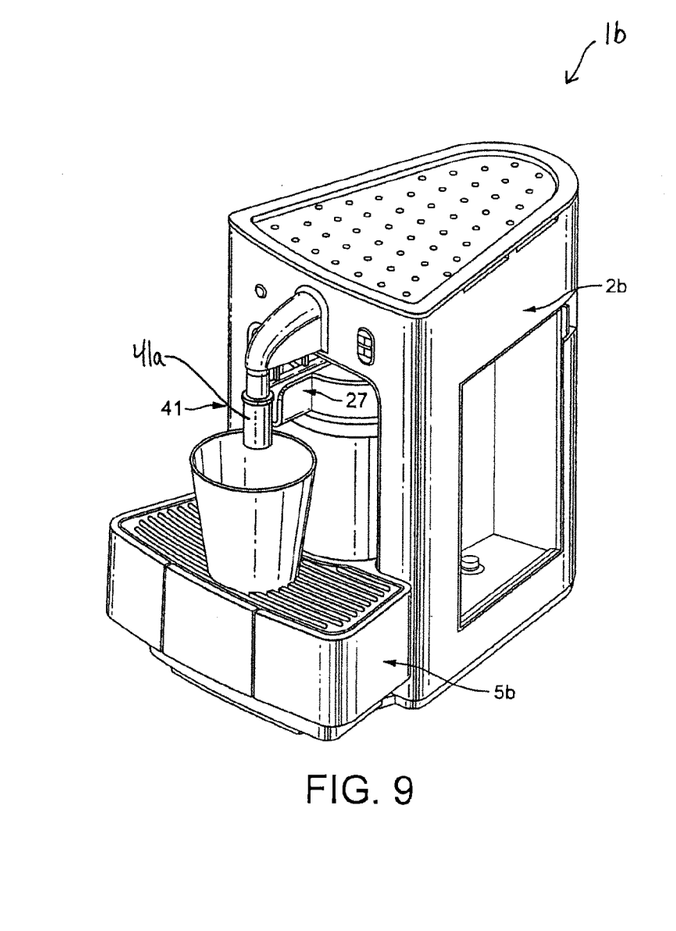
FIG. 9 shows a perspective view of a milk froth making device according to a varied embodiment of the present invention and where a short recipient is placed to receive the milk froth from a milk froth outlet, FIG. 10 show a perspective view of the milk froth making device of FIG. 9 where a longer recipient is placed to receive the milk froth from the milk froth outlet.

The housing further comprises a large recess 20b adapted to receive a heat-insulated milk vessel 25. The vessel serves to feed the frothing device with liquid milk. The recess is preferably heat insulated to reduce the heat transfers from the steamer to the vessel. The vessel has a lid 26 provided with a hole (not shown) and a U-shaped guide member 27 that protrudes radially from the lid. The liquid milk is supplied from the vessel to the frothing nozzle 41a by a disposable straw 28 or a thin walled tube which is inserted through the hole of the lid. The straw 28 is thus guided in the U-shaped guide member 27 up to the milk inlet connector of the nozzle 41a.

Figure 10:
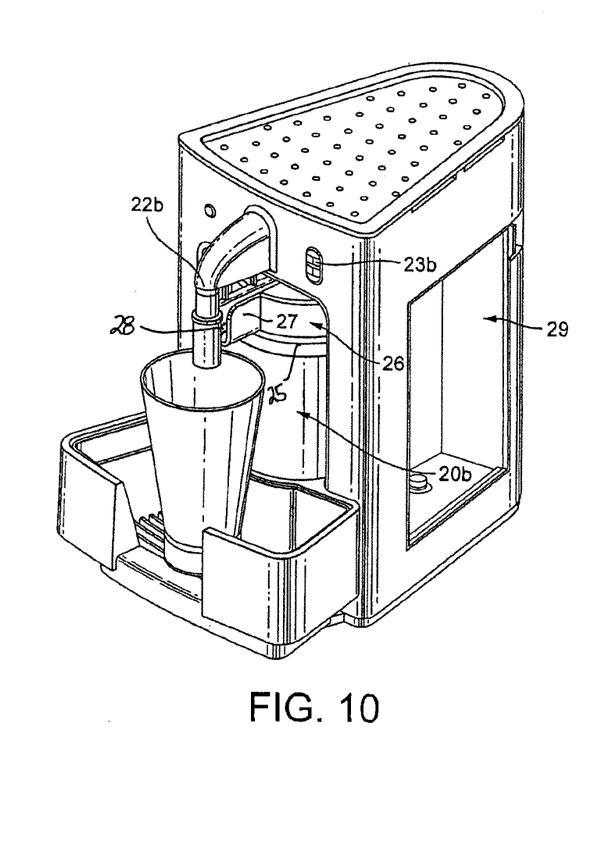
Figure 11:
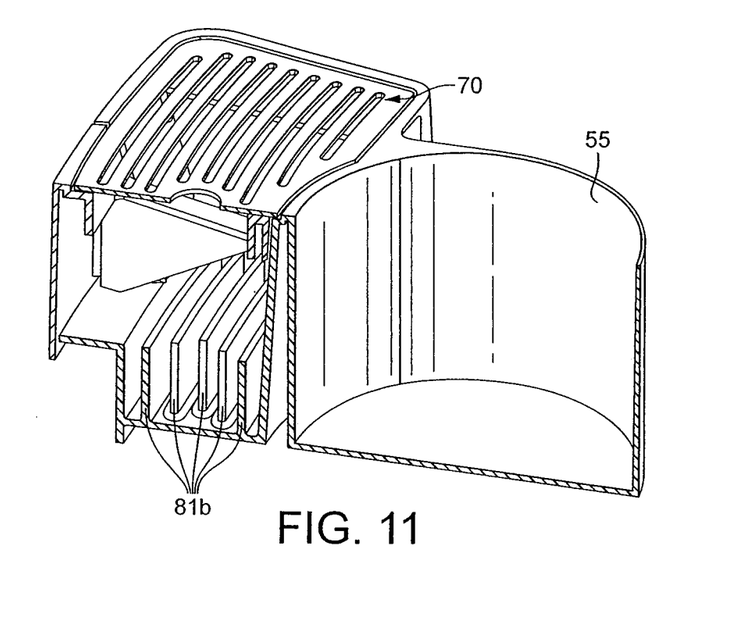
FIG. 11 is a cross sectional view of the drip tray device of FIG. 9.
Figure 12:
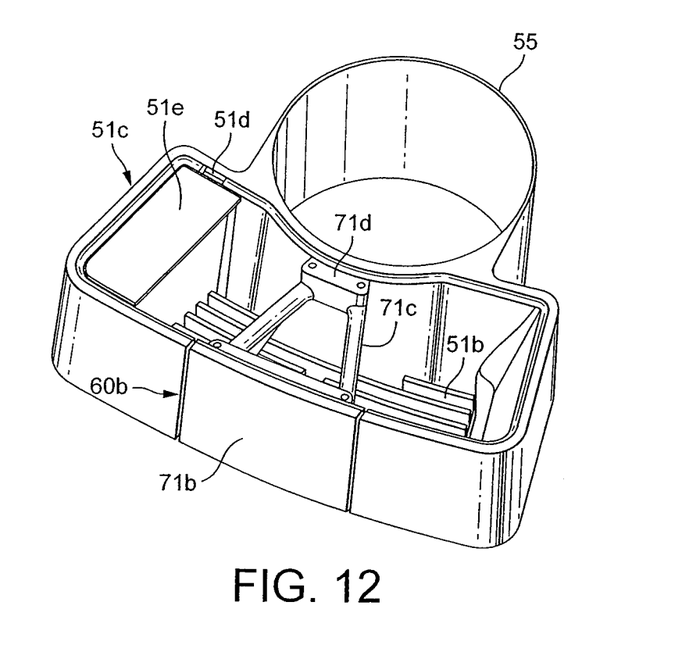
FIG. 12 shows a view of a detail of the drip tray device of FIG. 9.

The drip tray device 5b of the milk froth dispenser is removable as illustrated in FIGS. 11 and 12. The drip tray comprises a collect tank 51b of substantially rectangular shape which is removably closed by a upper grid 70b. The grid 70b serves as support for a small recipient such as a coffee cup. The grid can take support on an inner peripheral edge 51d of the walls of the collect tank. In the bottom of the tank is provided a lower drip support means, like a number of support elements 81b (e.g., a plurality of spaced apart ridges) or a grid that can receive a recipient of large height as shown in FIG. 10. The support elements 81b should be of sufficient height (e.g., between 10 to 25 mm) so that enough reserve space is made for liquid waste.

The collect tank has a front opening 60b to allow a space for a large recipient to be conveniently inserted on the lower drip support means. The opening 60b is closed by cover element 71b that comprises rigidifying members 71c with a support piece 71d for receiving the upper grid 70b in a stable manner.

The collect tank may also include a secondary reservoir 51c to receive water waste through a passage 51d from the dispenser such as water coming from the steamer when the steamer is emptied from water to reduce the scaling problems. The reservoir can have an upper door 51e that can be opened to empty the reservoir.

The drip tray device further comprises a receiving seat 55 for the vessel. The seat 55 has a shaped that is complementary to the base of the vessel so that the vessel can be inserted in the seat in a removable manner.

The milk froth dispenser works as follows. The user removes the milk vessel for filling it with fresh milk by withdrawing the entire drip tray device 5b as one block. The vessel is preferably refilled with milk that is at refrigerated temperature. Since the vessel has a thermos type structure, milk can be kept at low temperature during several hours. The lid closes the vessel and a straw is placed through the lid and in the U-shaped guide member.

The filled vessel is placed in the receiving seat 55 of the drip tray device and the assembly is inserted back to the housing. A disposable frothing nozzle is then plugged to the steam outlet/connector and the milk straw respectively at its steam inlet and milk inlet. Depending on the size of the recipient, the drip tray device is adjusted in height by manipulating the grid accordingly. The recipient is thus place below the milk froth outlet. The dispenser is switched on by pressing on command 23b. The steamer produces steam under pressure which steam is sent to the frothing nozzle device. By the venturi effect created in the nozzle device, liquid milk is sucked in the nozzle, warmed and frothed in the mixing chamber of the nozzle device. A hot milk froth is thus delivered in the recipient. After several uses, the frothing nozzle device is discarded and replaced by a new one.

The milk froth dispenser can be a stand alone system or can be a part or module of a coffee system. The milk vessel could also be separate from the housing or placed on a side of it (not necessarily in a recess).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A milk froth dispenser comprising:
   a housing with a steamer adapted to produce steam under pressure through a steam outlet conduit that is arranged to lead during use to a frothing nozzle, the housing having a recess adapted to receive a milk vessel in a removable manner, and
   a drip tray device adapted to receive a recipient, wherein the drip tray device is removable from the dispenser and has a receiving seat adapted to receive the milk vessel such that the milk vessel is located within the housing when the drip tray is in the dispenser, the receiving seat forming an open chamber comprising a chamber wall, the chamber having a shape that is complementary to a base of the milk vessel so that the milk vessel inserts into the receiving seat in a reversible manner, the chamber positioned in the recess of the housing when the drip tray device is in the dispenser, and the frothing nozzle being fed during use with milk from the milk vessel by a tube or straw taking milk from the milk vessel to the frothing nozzle.

2. The dispenser of claim 1, wherein the frothing nozzle is disposable and is configured to be removably plugged to the steam outlet conduit.

3. The dispenser of claim 1, which comprises a milk vessel in the receiving seat, wherein the milk vessel comprises a lid that closes the milk vessel with a guide member providing a passage for the pipe or straw up to a forward position at the front of the dispenser where the straw or tube can be plugged to the frothing nozzle.

4. The dispenser of claim 1, which comprises a milk vessel in the receiving seat, wherein the milk vessel is heat insulated to enable to store liquid milk under ambient temperature during several hours.

5. The dispenser according claim 1, wherein the recess is also heat insulated to reduce the heat transfers from the steamer to the milk vessel.

6. The dispenser of claim 1, wherein the drip tray device is placed below at least a beverage outlet for collecting dripping liquid and/or foam, the drip tray device comprising a first drip support grid for holding a first beverage recipient and a collect tank for collecting the liquid passing through the first drip support grid, the first drip support grid being removable from the collect tank and, when removed, the first drip support grid leaving open a second drip support means underneath configured for receiving a second beverage recipient of larger height.

7. The dispenser of claim 6, wherein the second drip support means comprises a grid or number of support elements, such as a plurality of spaced apart ridges, for supporting the second beverage recipient.

8. A removable tray device comprising:
   a receiving seat adapted to receive a vessel of milk to be frothed by a milk froth dispenser and forming an open chamber comprising a chamber wall, the chamber having a shape that is complementary to a base of the vessel so that the vessel inserts into the receiving seat in a reversible manner, the milk froth dispenser comprising a housing with a steamer adapted to produce steam under pressure through a steam outlet conduit that is arranged to lead during use to a frothing nozzle, the housing having a recess adapted to receive the milk vessel in a removable manner, the removable tray device adapted to receive a recipient, and being removable from the dispenser, the frothing nozzle being fed during use with milk from the milk vessel by a tube or straw taking milk from the milk vessel to a milk inlet of the frothing nozzle, and the chamber and the milk vessel located within the housing when the tray device is in the dispenser.

9. The device of claim 8, which comprises the milk vessel located on or in the receiving seat.

10. The device of claim 9, wherein in the milk vessel comprises a lid that closes the milk vessel with a guide member providing a passage for a pipe or straw.

11. The device of claim 8, which comprises a first drip support grid for holding a first beverage recipient and a collect tank for collecting the liquid passing through the first drip support grid, the first drip support grid being removable from the collect tank and, when removed, the first drip support grid leaving open a second drip support means underneath configured for receiving a second beverage recipient of larger height.

12. The dispenser of claim 1 further comprising a water supply reservoir located in a side of the housing.

13. The device of claim 8 further comprising further comprising a water supply reservoir located in a side of the housing.

* * * * *